July 26, 1955     W. J. BRUSKE     2,713,745
BRACKET LATCH DOG PAN TRIGGER ASSEMBLY FOR JAW TRAPS
Original Filed May 8, 1950
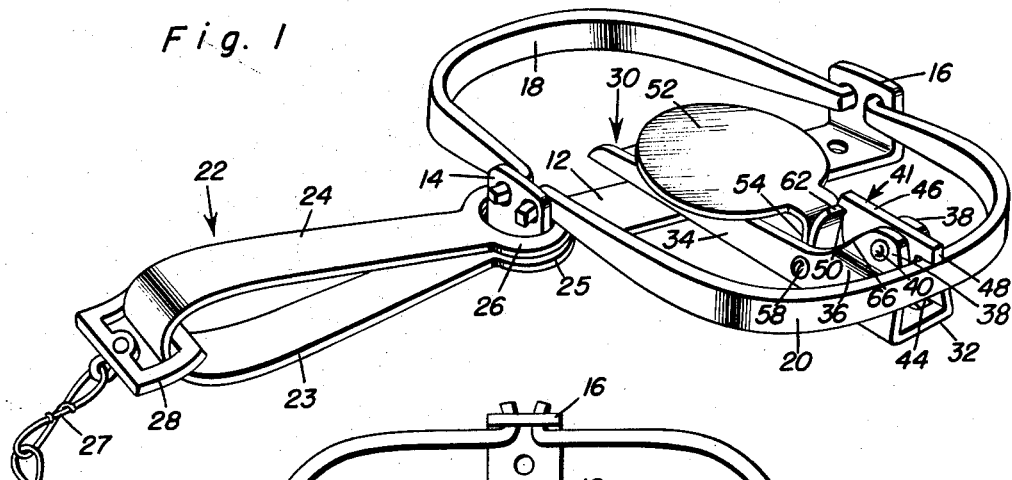
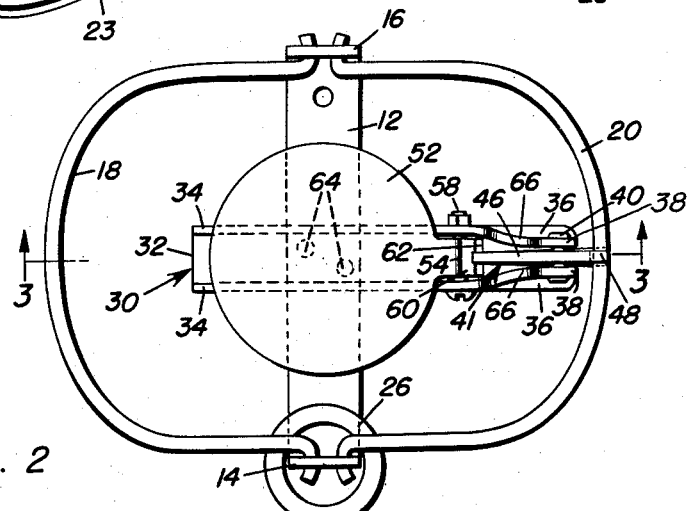
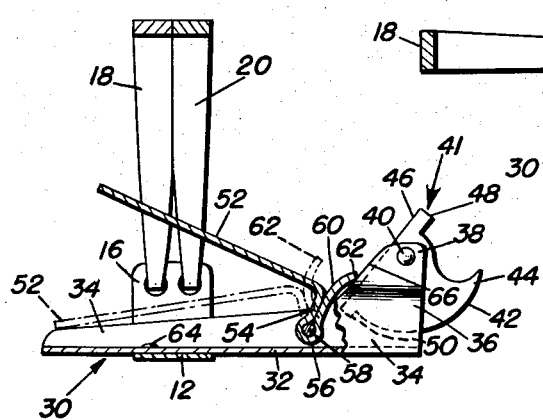
Walter J. Bruske
INVENTOR.

United States Patent Office 2,713,745
Patented July 26, 1955

2,713,745

BRACKET LATCH DOG PAN TRIGGER ASSEMBLY FOR JAW TRAPS

Walter J. Bruske, Fall Creek, Wis.

Original application May 8, 1950, Serial No. 160,787, now Patent No. 2,645,876, dated July 21, 1953. Divided and this application February 19, 1953, Serial No. 337,766

3 Claims. (Cl. 43—92)

This invention relates to certain new and useful improvements on conventional-type steel jaw game traps and has reference in particular to a novel self-contained assemblage which is herein aptly set forth as a bracket, latch dog, pan and trigger assembly expressly adapted for attachment to the usual base bar of the stated jaw trap.

One object of the invention is to improve upon a similarly constructed and performing bracket, latch dog, pan and trigger assembly revealed and covered in Patent 2,502,035 granted to me on March 28, 1950 and the reader will do well to make reference to the disclosures in said patent in order to bring to light a significant phase of the state of the art to which this invention appertains. What is more, it is to be further pointed out here that the subject matter of the instant presentation is a division of my copending application for patent identified as Serial No. 160,787, filed May 8, 1950 (now Patent 2,645,876, dated July 21, 1953).

In carrying out the principles of the present invention, I provide a rigid bracket which is channel-shaped in cross-section, and which has a flat bttom or bight portion and longitudinal vertical channel walls or flanges which are commensurate in length with said bottom. A horizontal pivot pin is mounted between the flanges at one end of the bracket and this bridges the channel portion. A substantially quadrantal flat faced latch dog is concentrically pivoted on the pin and is pendulum-like and freely swingable back and forth in a prescribed arcuate path between said flanges, said latch dog being weighted and adapted to drop, under forces of gravity, from its jaw setting and retaining to its free-to-reset position. A second horizontal hinge pin is also supported between the flanges and this is parallel to and inwardly of and on a plane below the plane of the first named pin. The second pin serves an anchoring and hinging means for unique pan means comprising a pan having a narrow flat shank bent upon itself between its ends so that it forms a hinge knuckle seated in the "channel" and hingedly attached to the cooperating pin. Bending of the shank is such that the free end portion thereof is laterally directed and forms an upstanding broad trigger for releasable engagement with keeper means provided therefor on a coacting edge portion of the companion latch dog.

A significant improvement resides in gradually increasing the vertical height of each of the flanges at the outward end of the bracket with the extended portions of the flanges defining closely spaced parallel ears to accommodate the stated hinge pin and to permit effective cradling and pendulous action of the latch dog which is suspended from the pin between the ears and flanges.

Further novelty is predicated on the feature of closely spacing the ears so that the inward vertical edges thereof constitute stop shoulders for the coacting end of the trigger, whereby the trigger, coming into contact with said edges limits the upward and outward arc of swing of the pan and trigger unit and in this way the pan is prevented from flopping over completely to be possibly twisted and broken by the struggles of an animal which has been caught. This safety pan stop arrangement prevents pan destruction and the loose suspension of the latch dog with proper clearances between surfaces of same and the ears serve to prevent sticking in case of the possible accumulation of rust when the trap is in use on the trap line.

Then, too, novelty is predicated on substituting a simple hinge pin for the post which is commonly used in brackets of this type. Further, considerable portions of the anchoring and hinging shank on the pan are confined and guarded against displacement and damage in the space between the wall forming flanges of the channel bracket.

Other objects and advantages will become more readily apparent from the following description and the accompanying illustrative drawings.

In the accompanying drawings wherein like numerals are employed to designate like parts throughout the views:

Figure 1 is a perspective view of a steel jaw game trap embodying my new and improved bracket, latch dog and special trigger equipped pan assembly, the trap being shown set for use.

Figure 2 is a top plan view of the same.

Figure 3 is a section taken on the line 3—3 of Figure 2, looking in the direction of the arrows.

Figure 4 is a view in section and elevation which is based on Figure 3 and wherein the parts are shown in the position assumed after the trap has been sprung and showing, in particular, the maner in which the detent end of the trigger comes into check-stop position against the cooperating stop shoulders, whereby to restrict the upward and outward tilt of the pan and to minimize pan and trigger destruction.

As stated above, the steel jaw trap proper is of general or ordinary construction. It comprises a flat horizontal base bar 12 having upstanding ends 14 and 16 with which the complemental jaws 18 and 20 are hingedly connected. The V-type jaw closing spring, also conventional is, denoted by the numeral 22 and its arms 23 and 24 terminate in customary eyes 25 and 26 which encircle the upbent end 14. The customary anchoring chain is denoted at 27 and this is attached by a link 28 to the spring 22.

The improved self-contained bracket, latch dog, pan and trigger assembly comprises an elongated channel-shaped bracket 30 having a flat bight or bottom portion 32 and duplicated vertical side flanges 34—34. In a lengthwise direction the flanges are gradually increased in vertical height toward the outer end portion of the bracket and may be said to include extensions 36—36 terminating in upstanding spaced parallel ears 38—38. The extensions converge as shown in Figure 2 and bring the ears into close spaced parallelism. A hinge pin 40 is mounted in the ears and spans the "channel" and this serves to accommodate and support the latch dog 41. The latch dog is substantially quadrantal and is concentrically pivoted on the pin 40 and is swingable back and forth between the ears 38 and coacting flanges 36 in a prescribed arcuate path. The latch dog is of such weight that it is adapted to drop under the forces of gravity from its jaw setting and retaining to its free-to-reset position. It is provided with a curvate marginal edge portion 42 (see Figs. 3 and 4) defining an approximate 90° arc and is thus adapted to swing within circumscribing limits of a predetermined circular path as shown in dotted lines in Figure 4. The outer vertical marginal edge is relieved or cut away and defines a reset beak 44. The third edge 46 is substantially flat and straight from end to end and one end portion projects beyond the second named edge and provides a jaw detent 48 which latter is adapted to overhang the jaw 20 as shown in the drawings. The beak 44 is designed and located to underlie said jaw 20. The marginal edge portion 42 is provided with a niche defining a keeper notch 50. The latch dog hangs loosely between the parts 38 and 36 as shown in Figure 4. One marginal edge of the circular pan, here shown at 52, is provided with a shank which corresponds substantially in width with the inside width of the channel. The shank is downbent at 54 as shown in Figures 3 and 4 and is then bent upon itself to form a hinge knuckle 56 which is anchored and hinged on a second hinge pin 58 mounted between the flanges 34 and protected by the flanges. The upwardly extending free end portion of the shank is longitudinally curvate and defines the trigger 60 which has a broad tip portion 62 to engage in the keeper notch 50. The bracket is riveted or otherwise secured at right angles to the intermediate portion of the base bar as at 64. The upstanding edge portions 66 of the ears constitute stops or abutments and limit swing of the pan and trigger as shown in Figure 4.

Most persons who have had little experience with traps have difficulty in setting them. This is because they try to compress the springs with their grip alone. If the trap spring is held in the left hand, against the left knee or leg, and pressure is then exerted on the upper side of the spring with the heel of the hand, it is easy. The right hand fingers should be under the cross bar and latch dog of the trap and the right hand thumb should be free to reach up and pull the trap jaw down in contact with the re-setting beak of the latch dog. Pincer pressure of the thumb on the jaw and with the fingers beneath the cross bar is then adjusted to bring the keeper notch of the dog in position to engage the trigger, which is cooperatively brought about by raising the pan with the index finger of the left hand from under the loose jaw. Engagement can also be had by tilting the entire trap with the loose jaw uppermost and toward you until gravity causes the pan to tilt of its own weight and thereby automatically bringing the trigger into contact position.

The broad trigger edge of my device constitutes an aid to the easy-set feature of my trap, as it makes it easy to releasably engage the broad trigger with the keeper notch of the latch dog, especially since said latch dog is necessarily hung loosely on its pivot pin because of possible rust accumulation at that point which would cause it to stick if the parts were tight fitting.

Another very important advantage afforded by the broad trigger edge is in combination with the converging ears of the channel bracket which, latter, act as stop shoulders to limit excessive pan tilt and in that way prevent pan and shank destruction.

Referring then to Figure 4, especially in relation with Figure 3, the parts are then shown in the position taken after the trap has been sprung and the catch (not detailed) has been made. Figure 4, however, shows the pan and trigger assembly in dotted lines which is the normal position the pan drops to and takes after the trap has been sprung. This figure also shows, in full lines, the manner in which the shoulders 66—66 come into play in checking the extreme upward and outward tilting position of the pan, a constructional feature which, as before stated, serves to limit excessive pan tilt and consequent pan damage or destruction. With this constructional feature even if the trapped animal succeeds in dragging and battering the trap against rock and rough terrain, the unlatched pan and trigger unit cannot flop completely over and outwardly beyond the bracket and is restricted to an outward position which is that shown in full lines in Figure 4. Consequently, neither the pan nor its shank will become unduly bent or twisted and thus rendered out of order when the trap is next to be set.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A bracket, a latch dog, and a unified pan-trigger assembly for attachment to the usual base bar of a steel jaw trap comprising a rigid one-piece bracket channel-shaped in cross-section from end to end and embodying a flat rigid bight portion and rigid side flanges of a length corresponding to the length of said bight portion, the outer end portions of the respective flanges being gradually increased in height, diminished in width, and converging and thus providing a pair of closely spaced parallel ears, a horizontal hinge pin bridging the channel and fixedly supported between the upper end portions of said ears, a latch dog less in thickness than the space between said ears and pivotally suspended on said pin and freely swingable back and forth in the clearance space between said ears and convergent portions of said flanges, a second horizontal hinge pin also fixedly supported between said flanges parallel to, inwardly of, and on a plane below that of the first named pin, and a pan overlying and swingable toward and from the upper edges of the underlying flanges, said pan having an integral shank projecting from one marginal edge, the intermediate portion of said shank being bent laterally downward and then upwardly and providing a generally U-shaped hinge knuckle, the latter encompassing and being hingedly joined with said second named pin, the upwardly bent portion of said shank being longitudinally curved and providing a trigger whose free end projects to a plane above the adjacent upper edges of said flanges for releasable engagement with said latch dog, the inward edges of said ears constituting stop shoulders and the free end of said trigger being of a length to swing through a limited arc into contact with said stop shoulders, whereby said free end is intended to engage said shoulders to limit the arc of swing of the pan and its shank in an upward and outward direction.

2. The structure defined in claim 1, and wherein said free end is of a width appreciably greater than the thickness of said latch dog to greatly assist one in engaging said free end with the marginal edge of said latch dog.

3. A bracket, a latch dog, a trigger and pan assembly for attachment intermediate its ends stop the usual base bar of a steel jaw trap comprising a rigid bracket channel-shaped in cross-section from end to end and including a flat rigid bight portion and rigid upstanding side flanges coextensive in length with the length of said bight portion, the outer end portions of said flanges being gradually increased in vertical height and converging toward each other and terminating in opposed closely spaced parallel ears, a horizontal hinge pin bridging the channel and supported between said ears, a substantially quadrantal latch dog secured to said pin and swingable back and forth in a prescribed arcuate path between said ears, said latch dog being of such weight that it is adapted to drop, under forces of gravity, from its jaw setting and retaining to its free-to-reset position, a second horizontal hinge pin also supported between the flanges in parallelism to and inwardly of and on a plane below the plane of the first named hinge pin, and a combination pan and trigger unit embodying a treadle overlying the upper edges of the underlying flanges and having an integral shank located between said flanges and provided with a portion mounted on said second pivot pin and confined between said flanges, the free end of said shank constituting a trigger and also a detent and being engageable with said latch dog, the width of the free end portion of said detent being greater than the distance between said ears, the inner vertical edges of the ears constituting check-stops which, under certain circumstances, are adapted to function as shoulders in a manner to limit the swinging of the treadle in a direction upwardly and away from said bracket and to, in this manner, minimize the likelihood of damage to the treadle or twisting of the shank.

References Cited in the file of this patent

UNITED STATES PATENTS

| | | |
|---|---|---|
| 312,094 | Cook et al. | Feb. 10, 1885 |
| 1,150,927 | Campbell | Aug. 24, 1915 |
| 1,630,419 | Fortin | May 31, 1927 |
| 2,502,035 | Bruske | Mar. 28, 1950 |